Figure 1:
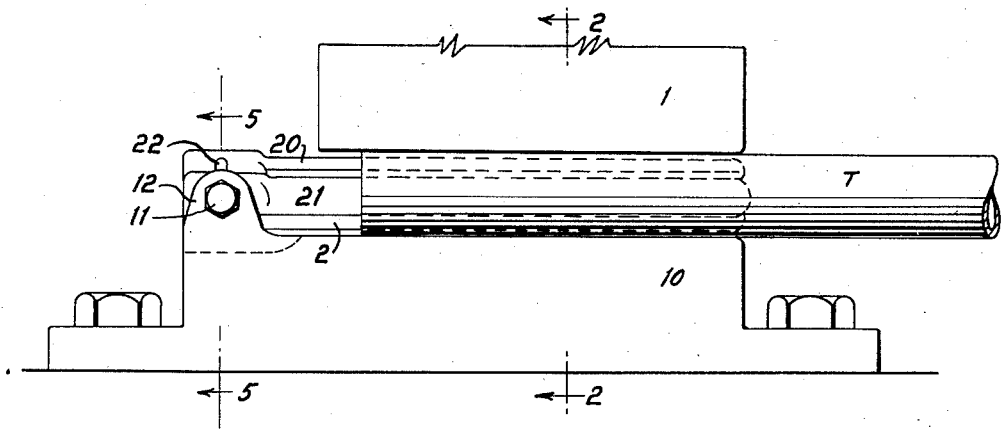

Dec. 2, 1947.  C. A. WARDEN  2,431,851

MANDREL AND METHOD FOR FLATTENING METAL TUBES

Filed Sept. 11, 1943

INVENTOR
CLYDE A. WARDEN
BY Reynolds + Beach
ATTORNEYS

Patented Dec. 2, 1947

2,431,851

UNITED STATES PATENT OFFICE 2,431,851

MANDREL AND METHOD FOR FLATTENING METAL TUBES

Clyde A. Warden, Seattle, Wash., assignor to Boeing Aircraft Company, Seattle, Wash., a corporation of Washington Application September 11, 1943, Serial No. 501,977

10 Claims. (Cl. 153—32)

The present invention relates to a machine for flattening tubes, and particularly for flattening an end portion of a tube.

In fabricating structures incorporating tubes, such as, for example, tubular trusses, frequently employed in the construction of airplanes, it is desirable in many instances to connect the end of a tube to a flat bar, lug or similar flat member. A connection of this type is usually effected by inserting the flat element into the end of the tube and securing them together, such as by a rivet or bolt extending through them.

In order to obtain maximum strength in such a joint contiguous engagement between the end of the tube and the flat member over a substantial area is desirable. For this purpose the end of the tube is usually flattened, so that the inner walls of the flat portion are spaced apart a distance just slightly greater than the thickness of the flat element, to provide a snug fit. The flattening operation may be facilitated by slotting the tube end, but this expedient materially weakens the joint. When not slotted, however, it is difficult by hand methods to flatten the tube end to the extent desired without working the metal excessively to remove wrinkles, which may result in the tube end being cracked or at least weakened unnecessarily.

It is therefore the principal object of my invention to provide a method which will facilitate the flattening of a tube although unslotted, and a machine for performing such method. The machine is particularly suitable for flattening the end portion of such a tube, although it may be utilized for flattening a portion intermediate its ends. The term "flattening" is intended to include collapsing a tube from circular to a shape other than one having flat sides, such as elliptical, as well as to truly flat sided shapes. During the flattening operation it is an object to stress the metal as little as possible, and particularly to support the tube wall so as to avoid reversing the bend of the metal at any location, which working might weaken the metal at that point. Thus the curvature of the tube sides to be flattened will be increased progressively, until they become planar if the final tube sides are to be of such shape. On the other hand, the side portions of the tube intermediate those to be flattened will be bent progressively more sharply to their final conformation. All portions of the tube sides will thus be subjected to the least possible bending stress during the deforming operation.

It is a further object to provide a machine which will perform the flattening operation quickly and extremely accurately, and which will alter the tube shape directly from cylindrical to the desired flattened conformation without requiring any manual preliminary or finishing operation.

Not only is my machine of simple construction, incorporating few parts, but the tube may be located easily and quickly preparatory to the flattening operation, and after its completion may be removed from the machine just as readily. Moreover the length of the flattened zone may be varied within limits without adjustment of the machine, and its parts may be interchanged readily to vary the degree of flattening of tubes of a given size, or to accommodate tubes of different size.

All these objects may be accomplished by a machine of simple and inexpensive construction, the parts of which are nevertheless rugged and sufficiently large to be quite strong, even when adapted to flatten small tubes.

While the preferred form of my machine is shown in the drawings it will be evident that various details may be changed, depending upon the size of tube to be flattened and the location and extent of such deformation, while still employing the main principles of my machine.

Figure 2:
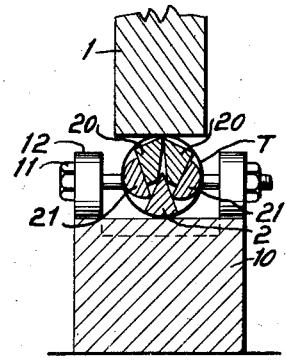

Figure 1 is a side elevation view of my machine, showing a tube in place preparatory to execution of the flattening operation, and Figure 2 is a transverse section taken on line 2—2 of Figure 1.

Figure 3:
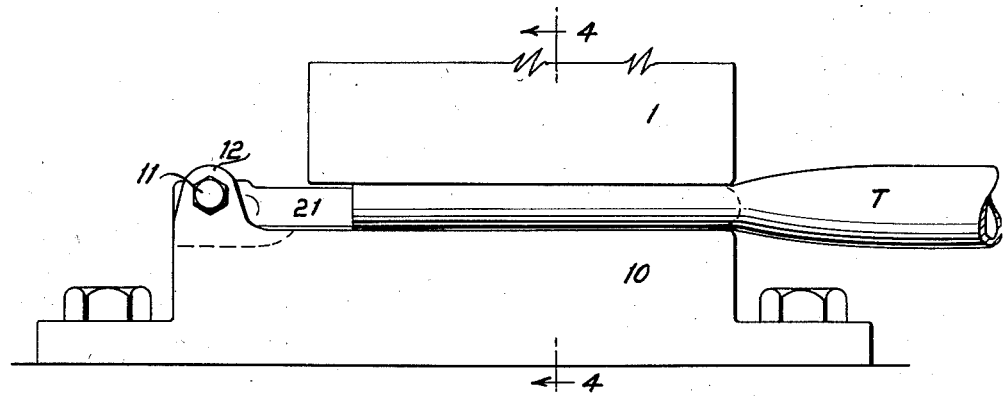
Figure 5:
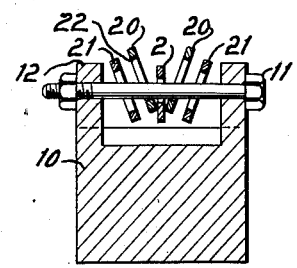
Figure 4:
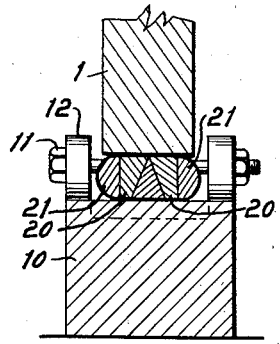

Figure 3 is a side elevation view of my machine similar to that of Figure 1, but showing the bars in lateral registry after completion of the flattening operation. Figure 4 is a transverse section through the machine similar to Figure 2 along line 4—4 of Figure 3. Figure 5 is a transverse section through the mandrel on line 5—5 of Figure 1.

So that the metal of the tube T will be subjected to minimum shock during the flattening process it is preferred that the operation be performed by squeezing rather than by impact.

A press suitable for this purpose may include a platen or plunger 1 shown located above a bed 10, but the positions of these parts may be reversed if desired. The type of press employed is largely immaterial, but conveniently it may be of the hydraulic type, although for light work a mechanically operated press may be adequate.

The important feature of my invention is the mechanism for supporting the tube wall during the deforming operation, so that its wall portions in contact with the platen and with the bed will be bent progressively outward to form arcs having successively greater radii until such sides become planar, while simultaneously the intermediate wall portions are being bent inward to define arcs of progressively smaller radii until their final minimum curvature is reached. Such shaping of the tube is controlled by positioning within the tube end, or other portion to be flattened, a divided mandrel, which is constructed to fit more or less loosely within the tube in cylindrical condition prior to it being flattened, but which will be pressed against the tube walls during the flattening process and will fill the tube after it has been flattened.

A representative form of mandrel, and one which I have found to be practical in use, is illustrated in the drawings. It consists of five angular, complementary, elongated bars relatively displaceable transversely of their lengths to fit within the tube prior to deformation, as shown in Figure 2, but which are rearranged and brought into the laterally registering positions of Figure 4 by the flattening operation. Of the five bars the central bar 2, serving somewhat as a keystone, is shown to be triangular in cross section, although it may be trapezoidal including an upper face of appreciable width and parallel to the lower face. The triangular shape is merely a special example of a wedging shape, and the term wedging as used generally herein is to be interpreted as including triangular and trapezoidal shapes, unless otherwise specified.

Intermediate bars 20 of identical trapezoidal shape in cross section, though reversed in position, lie one at each side of the central bar 2. While the bars 20 are shown to be specifically trapezoidal, they also may be triangular. In either case, however, their faces adjacent to the central bar 2 are complemental to the faces of such central bar engaged thereby. Also the width of bars 20 between their parallel faces is equal to the altitude of the central triangular bar 2. The surfaces of bars 20 remote from bar 2 may be perpendicular to their parallel faces so that the two bars 20 and the bar 2 together form a structure of rectangular cross section, as shown in Figure 4, when the opposite sides of bar 2 contiguously abut the adjacent sides of bars 20, respectively.

At the extreme sides of the assembly are bars 21 having curved sides, which are of segmental cross section, preferably being of semicylindrical shape for tubes whose opposite sides are to be truly planar, since a circular arc is least sharp at all locations. The diameters of the side curves will be equal to the thickness of the intermediate bars 2 and 20, between their parallel sides if specifically trapezoidal, or to their altitude if triangular, so that such curves will be tangent to the flat part of the mandrel formed by the intermediate bars. The curvature of bars 21 is, of course, selected to conform to the desired curvature of the tube sides between press platen 1 and base 10 when the flattening operation is completed, and if such press parts are concave, as would be required to form an elliptical tube portion, the corresponding sides of the mandrel bars would be shaped complementally and the other sides of appropriate fairing curvature.

The bars 2, 20 and 21, for ease of handling, and particularly when it is desired to flatten only the end of a tube, are loosely interconnected at one end. A tie member 11, secured in ears 12 upstanding from the press bed 10, passes through apertures 22 in all the adjacent ends of the bars. Such apertures may be only slightly larger than the tie member if it is inherently flexible, or, if the tie member is a bolt fitting tightly in the ears, the bar apertures are preferably in the form of slots elongated transversely of the bars. Either type of connection enables the mandrel bars to move freely transversely of their lengths between the positions of Figure 1 and Figure 3, but the connection of the bars should be sufficient inflexible so that no two bars can cross.

For insertion in a tube the elements 20 of the divided mandrel are displaced outward in one direction and the element 2 is displaced outward in the opposite direction from lateral registry of the bars. Because of the opposite transverse taper of the intermediate bars the extreme bars 21 may be displaced laterally inward as shown in Figure 2. With the parts in such relative positions the outer corners of the bars generally define a circle of at least as small a diameter as the tube prior to being shaped. With the elements of the mandrel thus held the tube end is slipped over all the mandrel bars into the position shown in Figure 1. The extent of projection of the tube into the press and over the divided mandrel will determine the degree of tube length which will be flattened. Preferably the circle defined by the corners of the mandrel bars in such relationship should approach the internal diameter of the tube. In such disposition it will be noted in Figure 1 that all the bars are substantially parallel, even though displaced laterally, so that their transverse relationship is practically identical throughout the length of the tube encircling the mandrel.

When the press platen 1 descends, pressure on the central bar 2 and intermediate bars 20, displaced outwardly, will force them toward lateral registry with each other. Because of the complemental wedging shape of these bars such inward movement will effect outward movement of the lateral faces of bars 20 remote from bar 2. Since these bar faces are in engagement with the flat faces of bars 21, such bars will be forced apart to push the side walls of the tube engaged thereby in directions perpendicular to the press movement. As the press forces the top and bottom portions of the tube toward each other, therefore, the divided mandrel will press outward the wall sections of the tube between the press platen and bed. Such movement continues until all the bars 2, 20 and 21 have moved into registry in the positions of Figure 4.

The sizes of the mandrel bars will be such that at the same time all the bars are in registry they will completely fill and contiguously engage the walls of the flattened tube. The press, therefore, rests on an effectively solid structure, so that its movement is interrupted when the flattening operation is completed. It is merely necessary thereafter to raise the platen 1 and to withdraw the tube T endwise off the mandrel. During such movement, of course, the mandrel bars are held by the bolt 11.

Various factors should be considered in the design of my divided mandrel for performing a particular flattening operation. While for purposes of illustration it is shown to be composed of five bars, it may be formed of a different number, depending to some extent upon the relative proportions of the flattened tube. Particularly if the tube is to be flattened only slightly division of the mandrel into a larger number of bars may be required. Conversely if the minor axis of the flattened tube is to be less than one-half the original diameter, yet it should be desired to have the corners of the mandrel bars contact the tube shortly after the flattening operation is begun, a fewer number of bars, such as four or even three, may suffice.

The bars in every case in the aggregate should include three features. First, when they are moved from laterally displaced relationship, such as shown in Figure 2 for example, into the registering relationship of Figure 4, a wedging action should be produced, to exert a lateral expanding force internally on the tube wall between the press parts at the same time that the wall portions engaged by the press parts are pressed externally. Second, the extreme bars should have curved faces conforming to the final curvature of the tube wall at opposite ends of its major axis. Third, the mandrel should have upper and lower faces complemental in shape to the press surfaces to engage the tube wall contiguously.

The proportioning of the parts, of course, depends upon the extent to which the tube is to be flattened. Use of the mandrel illustrated effects flattening of the tube to a section having a minimum diameter approximately one-half the original diameter of the tube. The minor axis might, however, be more or less than such proportion. In designing the bars of the divided mandrel, therefore, the first consideration is to select the dimensions for the minimum and maximum diameters of the flattened tube. If opposite sides of the tube are to be flat and the other sides semicylindrical, the length of the minor axis establishes immediately the radius of curvature of the extreme bars 21, the thickness of intermediate trapezoidal bars 20 between their parallel faces, and the altitude of the central triangular bar 2.

Knowing the length of the minor axis, the length of the major axis may be determined, since it is known that the circumference of the tube T prior to deformation will be approximately equal to the lengths of the flattened sides plus the lengths of the convex sides of the flattened tube. Perhaps the perimeter of the flattened tube will be somewhat greater than the circumference of the tube prior to being flattened, because it may be desirable to stretch the metal of the tube slightly during the flattening operation. In some instances the tube may be stretched even beyond the elastic limit of the metal to preserve accurately the final flattened shape of the tube after the pressure of the press and mandrel has been relieved.

Where the mandrel is composed of five bars the length of the longer parallel side of each trapezoidal bar 20 may now be established as one-half the length of a flat side of the flattened tube, as viewed in Figure 4. Two considerations enter into the selection of the apex angle of the triangular bar 2 and the length of the shorter parallel side of each trapezoidal bar 20. First, in order that the tube walls may be supported against buckling throughout substantially the entire flattening operation, it is desirable that the circle defined by the corners of the non-aligned tubes, as shown in Figure 2, be very nearly as large as the tube to be flattened. Almost immediately after the pressing operation is commenced, therefore, the tube walls are engaged at several spaced locations, so that they cannot be buckled inward. As shown in Figure 2, the tube walls are thus engaged internally at seven approximately equally spaced points.

Secondly, the bars 21 should engage the tube wall substantially at opposite ends of the tube diameter which becomes the major axis of the flattened tube, so that the internal pressure will be exerted at the most effective locations at all times, and the bars need not slide appreciably relative to the tube wall while pressed against it. Similarly the other points of engagement should correspond very nearly to the points of the tube wall finally engaged by the same portions of the mandrel elements after the flattening operation has been completed. It will be evident that the degree of relative spreading movement of bars 2 and 20 transversely of their lengths is related to the degree of approach movement of bars 21 transversely of their lengths to define the circle circumscribing the mandrel. The more a tube is to be flattened, therefore, and consequently the thinner the bars 2, 20 and 21 are, the more bars 2 and 20 must move outward, and the more bars 21 must move inward.

In general the smaller the apex angle of bar 2 the larger must be the circle required to circumscribe the mandrel bars in non-registering position. Also the bars of a mandrel with fewer parts can be expanded more than one composed of a greater number of bars with the bars in contact. Over a considerable range, therefore, the number of bars, their proportions, and the degree of inclination of their abutting sides relative to their external surfaces, may be selected so that the bars of a mandrel which will fill a given flattened tube may, by relative transverse movement, define a circumscribed circle by their corners which approaches in size the interior of the tube prior to being flattened.

Generally speaking, a relatively large number of bars composing the mandrel is desirable, for as pointed out above, five bars make seven points of contact with the tube walls during deformation of the tube. If a smaller number of bars is used they will contact the tube walls at fewer locations. A large number of contact zones is not as important if the wall of the tube is reasonably thick than for a thin walled tube. Bolt 11, or an equivalent connection, should be readily removable for substitution of a different set of bars, either to deform tubes of the same size to a different degree, or to accommodate tubes of different size. The same press, if of variable stroke, may be used, but the ears 12 through which bolt 11 passes should be slotted vertically, or other provision should be made for varying the height of the mandrel bars as a group above the press bed 10 if necessary.

Particularly where the circle circumscribing the bars of the mandrel in relationship for inserting into the tube is very nearly equal to the internal diameter of the tube, it is desirable for the ends of the bars to be slightly tapered or chamfered so that the tube may be slipped over the mandrel easily. The angular shape of the several mandrel rods renders them rigid to resist bending by careless handling, even though they may be of small size for use in flattening small tubes.

What I claim as my invention is:

1. A longitudinally divided mandrel for use in tube flattening operations, comprising two elongated side bars having their outer surfaces curved substantially semicylindrically, and three intermediate bars of trapezoidal cross section, alternate bars being tapered transversely of their lengths in opposite directions for mutual wedging engagement, and thereby being operable, by contraction of the mandrel in one direction transversely of the lengths of said bars, to expand the mandrel transversely of the lengths of said bars in the direction perpendicular to such direction of contraction.

2. A longitudinally divided mandrel for use in tube flattening operations, comprising two elongated semicylindrical side bars, a center elongated bar triangular in cross section, and two elongated bars of trapezoidal cross section disposed, respectively, intermediate said center and said side bars, each of said trapezoidal bars having a side complemental to a side of the side bar adjacent thereto and a side complemental to a side of said center bar, said bars being movable transversely of their lengths into registry with such complemental sides in abutment, and all said bars being of equal thickness transversely of their lengths in the direction perpendicular to their direction of registry.

3. A divided mandrel for use in tube flattening operations, comprising a group of bars composed of a plurality of elongated bars having sides adapted for mutual sliding abutment, and means extending transversely of the lengths of said bars interconnecting the corresponding ends of all said bars for disposition of said bars in parallel relationship, and permitting limited relative sliding movement of said bars transversely of their lengths while in abutment and disposed in previse parallelism at all times throughout their entire lengths, but operable to restrain relative swinging of said bars to an extent sufficient to dispose any two thereof in crossed relationship.

4. A divided mandrel for use in tube flattening operations, comprising a group of bars composed of more than two interfitting elongated bars having edges which, while such bars are in contact with each other, are disposed substantially at more than four points on a circle circumscribing the group of bars which points are generally equally spaced about such circle, and said group of bars having a composite perimeter transversely of their lengths substantially equal to the circumference of such circumscribing circle when said bars are disposed in their positions of abutting registry assumed by them upon completion of the tube flattening operation.

5. A longitudinally divided mandrel for use in tube flattening operations, comprising a group of bars composed of a plurality of complementally elongated bars, each bar being of uniform cross section throughout its length, including an intermediate bar of angular cross section, and two side bars of segmental cross section, all said bars being of substantially equal thickness, and the width of said group of bars, when all its bars are in abutting registry, in one direction transversely of the length of the bars being greater than in the direction perpendicular to such direction of greater width, and said group of bars, when all its bars are in abutting registry, being symmetrical about a median plane of said group of bars disposed parallel to such direction of greater width.

6. A longitudinally divided mandrel for use in tube flattening operations, comprising a group of bars composed of a plurality of complementary elongated bars, including two intermediate bars, each having a planar outer side and an abutment side joined at an acute angle, and two side bars each having a convex side, all of said bars being of substantially equal thickness, the outer sides of said intermediate bars being disposed in spaced parallel relationship when their abutment sides are in mutual abutment.

7. A longitudinally divided mandrel for use in tube flattening operations, comprising two like elongated side bars each having a convex side and a side defining a plane, and a plurality of intermediate bars of wedging cross section having sides defining planes adapted to abut the sides of said side bars defining planes, said planar sides of said intermediate bars being of a width not greater than the width of said planar sides of said side bars.

8. A divided mandrel for use in tube flattening operations, comprising a group of bars composed of a plurality of elongated bars adapted to be grouped out of transverse registry in generally parallel relationship, each of said bars including a portion of substantial length having a constant cross section, the maximum thickness of each of said bars in its portion of constant cross section being at least as great as the radius of a circle circumscribing the group of bars and touching each of said bars when the bars are in contact but are out of transverse registry, the greatest composite width of said bars when abutting with their portions of constant cross section disposed in transverse registry exceeding the diameter of such circumscribing circle by a substantial amount.

9. A longitudinally divided mandrel for use in tube flattening operations comprising a group of bars including more than two elongated bars arranged out of transverse registry in generally parallel relationship, all of said bars being of substantially equal width in one direction transversely of their lengths and over corresponding substantial portions of their lengths, said bars, when disposed in abutting registry, forming a group of a width in said one direction transversely of the lengths of the bars substantially equal to said equal width of said corresponding portions of the several bars, and of a width in a different direction transversely of the lengths of the bars over said corresponding portions thereof substantially greater than said equal width dimension of said bars, the said equal width dimension of said corresponding portions of the bars being at least as great as the radius of a circle having a circumference equal to the perimeter of the group of bars when said bars are in abutting transverse registry.

10. The method of flattening a tube which comprises engaging the side bars of a longitudinally divided mandrel with the wall of the tube substantially at opposite ends of a diameter thereof, arranging other bars between said side bars and out of transverse registry with said side bars, applying to the tube a flattening force substantially perpendicular to such diameter and thereby pressing the sides of the tube against said other bars and moving them transversely of their lengths in wedging engagement with said side bars into transverse registry therewith, and by such wedging action of said other bars forcibly moving said side bars away from each other substantially along such diameter of the tube on which said side bars engage the tube, and throughout substantially the entire flattening operation maintaining said side bars in contact with substantially the same portions of the tube wall.

CLYDE A. WARDEN.

REFERENCES CITED

The following references are of record in the file of this patent:

UNITED STATES PATENTS

| Number | Name | Date |
|---|---|---|
| 359,205 | Curtis et al. | Mar. 8, 1887 |
| 716,555 | King | Dec. 23, 1902 |
| 8,256 | McCarty | July 29, 1851 |
| 956,311 | Dittmann | Apr. 26, 1910 |
| 2,272,547 | Coordes | Feb. 10, 1942 |
| 1,901,762 | Meyer | Mar. 14, 1933 |
| 1,748,158 | Walp | Feb. 25, 1930 |
| 1,982,362 | Trembley | Nov. 27, 1934 |
| 2,312,095 | Welty | Feb. 23, 1943 |
| 693,186 | Sweet | Feb. 11, 1902 |
| 80,464 | Doolittle | July 28, 1868 |
| 1,922,716 | Robinett | Aug. 15, 1933 |
| 1,435,679 | Young | Nov. 14, 1922 |
| 2,312,094 | Harmon | Feb. 23, 1943 |

FOREIGN PATENTS

| Number | Country | Date |
|---|---|---|
| 346,455 | Germany | Jan. 2, 1922 |